(12) United States Patent
Chidlovskii et al.

(10) Patent No.: US 9,519,060 B2
(45) Date of Patent: Dec. 13, 2016

(54) METHODS AND SYSTEMS FOR VEHICLE CLASSIFICATION FROM LASER SCANS USING GLOBAL ALIGNMENT

(71) Applicant: Xerox Corporation, Norwalk, CT (US)

(72) Inventors: Boris Chidlovskii, Meylan (FR); Gabriela Csurka, Crolles (FR); Jose Antonio Rodriguez Serrano, Gremoble (FR)

(73) Assignee: Xerox Corporation, Norwalk, CT (US)

( * ) Notice: Subject to any disclaimer, the term of this patent is extended or adjusted under 35 U.S.C. 154(b) by 284 days.

(21) Appl. No.: 14/287,538

(22) Filed: May 27, 2014

(65) Prior Publication Data
US 2015/0346326 A1    Dec. 3, 2015

(51) Int. Cl.
| | | |
|---|---|---|
| *G01C 3/08* | (2006.01) | |
| *G01S 17/88* | (2006.01) | |
| *G01S 17/42* | (2006.01) | |
| *G01S 7/48* | (2006.01) | |
| *G06T 7/00* | (2006.01) | |
| *G01S 17/89* | (2006.01) | |
| *G06K 9/00* | (2006.01) | |

(52) U.S. Cl.
CPC ............ *G01S 17/88* (2013.01); *G01S 7/4802* (2013.01); *G01S 17/42* (2013.01); *G01S 17/89* (2013.01); *G06K 9/00805* (2013.01); *G06T 7/00* (2013.01)

(58) Field of Classification Search
CPC ......... G01S 7/4808; G01S 17/08; G01S 17/88
USPC ....................................................... 356/5.01
See application file for complete search history.

(56) References Cited

U.S. PATENT DOCUMENTS

| | | | | |
|---|---|---|---|---|
| 6,195,019 B1* | 2/2001 | Nagura | ................ | G07B 15/063 235/384 |
| 2007/0058836 A1* | 3/2007 | Boregowda | ........ | G06K 9/00771 382/103 |
| 2008/0294401 A1* | 11/2008 | Tsin | .................... | G06F 17/5095 703/8 |
| 2014/0176679 A1* | 6/2014 | Lehning | ............ | H04N 13/0275 348/46 |

OTHER PUBLICATIONS

Harsimrat Singh Sandhawalia et al., "Vehicle Classification from Laser Scanners Using Fisher and Profile Signatures", U.S. Appl. No. 13/963,472, filed Aug. 9, 2013.
Peter Axelsson, "Processing of Laser Scanner Data—Algorithms and Applications", ISPRS Journal of Photogrammetry and Remote Sensing, vol. 54, 1999, pp. 138-147.
Marco Cuturi et al., "A Kernel for Time Series Based on Global Alignments", Proceedings of ICASSP, vol. II, 2007, pp. 413-416.

(Continued)

*Primary Examiner* — Mark Hellner
(74) *Attorney, Agent, or Firm* — MH2 Technology Law Group LLP

(57) ABSTRACT

A system and method for classifying vehicles from laser scan data by receiving laser scan data corresponding to multiple vehicles from a laser scanner; extracting vehicle shapes corresponding to the multiple vehicles based on the laser scan data; aligning the vehicle shapes; and generating vehicle profiles based on the aligned vehicle shapes. The system and method can further include aligning the vehicle shapes using sequence kernels, such as global alignment kernels, and constraining the sequence kernels based on determined weights.

18 Claims, 7 Drawing Sheets

(56) References Cited

OTHER PUBLICATIONS

Marco Cuturi, "Fast Global Alignment Kernels", Proceedings of ICML 2011, 2011, pp. 1-8.
Jeffrey Erman et al., "Traffic Classification Using Clustering Algorithms", SIGCOMM '06 Workshops, Sep. 2006, pp. 1-6.
Tilmann Gneiting, "Compactly Supported Correlation Functions", Journal of Multivariate Analysis, vol. 83, Jan. 2002, pp. 493-508.
Antonia Kyriakopoulou et al., "Using Clustering to Enhance Text Classification", Proceedings of SIGIR '07, Jul. 2007, pp. 805-806.
Frank Moosmann et al., "Randomized Clustering Forests for Image Classification", IEEE Transactions on Pattern Analysis and Machine Intelligence, vol. 30, No. 9, Sep. 2008, pp. 1632-1646.
Stan Salvador et al., "FastDTW: Toward Accurate Dynamic Time Warping in Linear Time and Space", Intelligent Data Analysis, vol. 11, Issue 5, Oct. 2007, pp. 1-11.
Nao Shibuhisa et al., "Accurate Vehicle Localization using DTW between Range Data Map and Laser Scanner Data Sequences", Proceedings of the 2007 IEEE Intelligent Vehicle Symposium, Jun. 2007, pp. 975-980.
Harsimrat Sandhawalia et al., "Vehicle type classification from laser scanner profiles: a benchmark of feature descriptors", Proceedings of ITSC 2013, Oct. 2013, pp. 517-522.

\* cited by examiner

METHODS AND SYSTEMS FOR VEHICLE CLASSIFICATION FROM LASER SCANS USING GLOBAL ALIGNMENT

TECHNICAL FIELD

The present disclosure relates generally to methods, systems, and computer-readable media for vehicle classification using laser scans.

BACKGROUND

The ability to classify vehicles quickly and efficiently is needed in a number of transportation and security applications, and laser scanner sensors have been employed for such vehicle classification. In general, laser scanners are measuring devices that emit pulses of light towards objects. These devices can, for example, detect the part of the light that is reflected from the objects, measure the time difference between emission and reflection, and derive a distance to the object. The operation can be repeated for a varying set of angles. Scanners can be placed overhead of passing traffic to capture top views, on the side passing traffic to capture side views, facing traffic to capture front views, and/or a combination thereof.

Laser scanners are a common type of equipment for vehicle classification. For example, laser scanners can be used for determining the vehicle type in tolls. However, this is usually achieved by simple solutions such as extracting a few high-level features and classifying them (sometimes with simple rules), or matching the raw laser profiles.

As an example, some systems have been developed for vehicle classification, which extract the following features from a laser scan: width, height, length, number of vehicle units, and height of the first unit. Using this approach, vehicles can be classified using simple rules comparing feature values with pre-specified thresholds. While such an approach might provide initial satisfactory performance, it is limited in scope and efficiency, requires intense human labor and expertise, and lacks learning classification capabilities Accordingly, laser scanning technologies may benefit from proved techniques of classifying vehicles from the results of the scan.

SUMMARY

The present disclosure relates generally to methods, systems, and computer readable media for providing these and other improvements to laser scanning technology.

Implementations of the present teachings relate to methods for classifying vehicles from laser scan data. In some embodiments, a computing device can receive laser scan data, corresponding to multiple vehicles, from a laser scanner. Based on the laser scan data, the computing device can extract vehicle shapes corresponding to the multiple vehicles. The computing device can align the vehicle shapes, and then generate vehicle profiles based on the aligned vehicle shapes.

In certain implementations, the computing device can align the vehicle shapes using sequence kernels, such as global alignment kernels. Additionally, the computing device can constrain the sequence kernels based on determined weights.

In some embodiments, the computing device can further classify the multiple vehicles by comparing the vehicle shapes to the vehicle profiles.

In further embodiments, the computing device can receive, from the laser scanner, additional laser scan data corresponding to a vehicle, and can extract an additional vehicle shape based on the additional laser scan data. Then, the computing device can classify the vehicle by comparing the additional vehicle shape to the vehicle profiles.

In some embodiments, the plurality of vehicle shapes can be two-dimensional shapes, while, in further embodiments, the plurality of vehicles shapes can be three-dimensional shapes.

In still further embodiments, the computing device can, prior to extracting the vehicle shapes, replace missing data in the laser scan data, for example, using interpolation based on the missing data's nearest neighbor in the laser scan data.

In other embodiments, the computing device can identify and extract data corresponding to vehicles of interest in the laser scan data, where extracting, based on the laser scan data, the vehicle shapes includes extracting the vehicle shapes from the extracted data.

Implementations of the present teachings relate to computer systems for classifying vehicles from laser scan data, the systems include one or more memory devices storing instructions, and one or more processors coupled to the one or more memory devices. The one or more processors are configured to execute the instructions to perform methods and operations. The methods and operations include receiving laser scan data, corresponding to multiple vehicles, from a laser scanner. Based on the laser scan data, the methods and operations further include extracting vehicle shapes corresponding to the multiple vehicles, aligning the vehicle shapes, and then generating vehicle profiles based on the aligned vehicle shapes.

In certain implementations, the methods and operations can further include aligning the vehicle shapes using sequence kernels, such as global alignment kernels, and constraining the sequence kernels based on determined weights.

Implementations of the present teachings also relate to computer readable storage media storing instructions. The instructions cause one or more processors to perform methods and operations for classifying vehicles from laser scan data. The methods and operations include receiving laser scan data, corresponding to multiple vehicles, from a laser scanner. Based on the laser scan data, the methods and operations further include extracting vehicle shapes corresponding to the multiple vehicles, aligning the vehicle shapes, and then generating vehicle profiles based on the aligned vehicle shapes.

In certain implementations, the methods and operations can further include aligning the vehicle shapes using sequence kernels, such as global alignment kernels, and constraining the sequence kernels based on determined weights.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
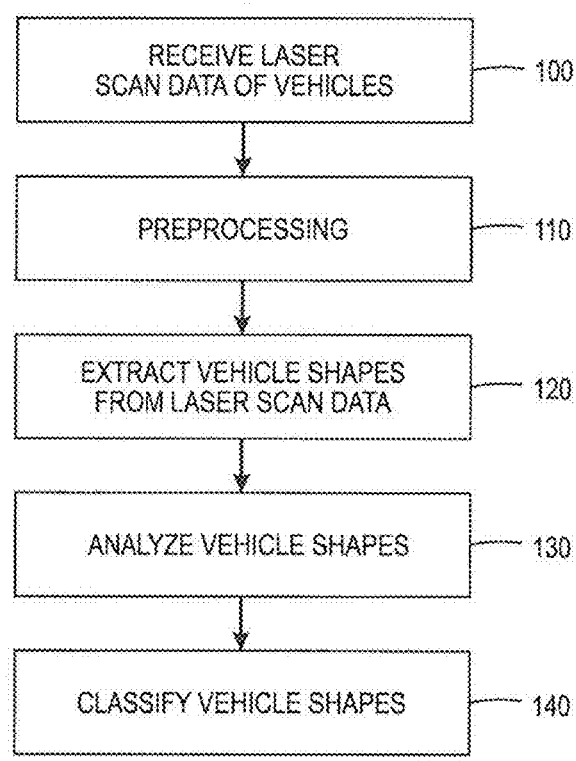
FIG. 1 is a flow diagram illustrating an exemplary method of classifying vehicles from laser scan data, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a flow diagram illustrating an exemplary method of classifying vehicles from laser scan data, consistent with certain disclosed embodiments. The process can begin in 100 when a computing device receives laser scan data corresponding to multiple vehicles. In some embodiments, the computing device can receive the laser scan data from a laser scanner that is directly or indirectly attached to the computing device. In other embodiments, the computing device can be remote to the laser scanner and can receive the laser scan data via, for example, a network connection.

As used herein, a laser scanner can refer to one or more devices (e.g. structured light devices) capable of emitting controlled beams of light (e.g. as a laser beam) and obtaining distance to object data based on scanning the controlled beams (e.g. LIDAR technology). For example, the laser scanner can emit a beam of light and then measure the time difference between emission and when the beam is reflected back to a scanner. The time difference can be used to derive a distance to an object. The angle of the beam can be controlled and multiple beams from different angles can be used to derive, for example, data indicative of an object shape.

Additionally, as used herein, laser scan data can refer to time, distance to object, shape, and any additional data that can be obtained by a laser scanner.

In some embodiments, the laser scan data can be data collected from laser scanners positioned to scan various angles of vehicle traffic. For example, the laser scanners can be positioned to scan the front of oncoming vehicles, side views of passing vehicles, as well as indirect angles, such as angles that capture a combination of the front, side, and top of passing vehicles. Additionally, the laser scan data can come from a single laser scanner or from multiple laser scanners positioned to cover different lanes of traffic or to cover different angles of traffic.

In some implementations, the computing device can receive the laser scan data continually as the laser scanner generates the data from vehicle traffic, while, in further implementations, the computing device can receive the laser scan data periodically for multiple vehicles and/or for a block of time. In still further implementations, the computing device can initially receive a single set of laser scan data that includes data from vehicle traffic, and the single set of laser scan data can represent training data used to train the computing device for classifying vehicles in future laser scan data.

In 110, the computing device can, in some embodiments, perform one or more preprocessing steps on the laser scan data. The laser scan data received in 100 can potentially include data noise, data from overlapping vehicles, invalid data, etc. For example, weather condition such as snow, rain, and/or high vehicle speeds can introduce data noise, and surfaces that do not exhibit sufficient reflectivity can produce at least partially invalid laser scan data.

In some embodiments, the one or more preprocessing steps can include data interpolation of missing data that is removed as invalid or classified as noise. The missing data can be replaced by various regression methods using nearby values, such as, for example, interpolation (e.g. linear or hi-cubic) based on the missing data's nearest neighbor in the laser scan data (e.g. a distance measurement adjacent to that of the missing data).

In additional embodiments, the one or more preprocessing steps can include segmenting vehicle bodies. For example, when a vehicle being scanned (i.e. the vehicle of interest) overlaps with vehicles in neighboring lanes, the resultant laser scan data can include artifacts on the edges of the data that correspond to the vehicles in the neighboring lanes. Accordingly, each point of data in the laser scan data can be identified as the vehicle of interest or as background by setting thresholds and grouping points into connected components. Generally, the largest grouped rectangular region of points represents the vehicle of interest. According, the segments of data corresponding to the vehicles in neighboring lanes can be identified and the data corresponding to the vehicle of interest can be cropped.

In 120, the computing device can extract vehicle shapes from the laser scan data. The vehicle shapes can be, for example, two-dimensional or three-dimensional shapes. In some embodiments, the shapes can be extracted after the laser scan data has been preprocessed in 110.

Examples of two-dimensional and three-dimensional shapes are described in further detail below with regard to FIGS. 2 and 4. As used here in, a shape can refer to a data structure that includes distances measured by a laser scan for a single-variable coordinate (e.g. a horizontal coordinate) or two-variable coordinates (e.g. a horizontal and a vertical coordinate) and/or a two-dimensional or three-dimensional graph that is generated based on the data structure.

In 130, the computing device can analyze the shapes of vehicles. In embodiments, the computing device can perform clustering methods on the shapes of vehicles to identify common or typical patterns of shapes (as used herein, "vehicle profiles"). For example, the computing device can perform a k-means clustering algorithm on the shapes and generate multiple vehicle profiles based on the clustering.

Laser scans of passenger vehicles and laser scans of trucks can potentially produce substantially different shapes. A shape based on a first passenger vehicle may not be exactly the same as a shape based on a second passenger vehicle, but the shapes can be clustered together when compared to shapes based on laser scans of trucks. A vehicle profile for passenger vehicles can be generated based on an amalgamation of clustered shapes of passenger vehicles.

In 140, the computing device can classify shapes of vehicles. In some embodiments, the computing device can classify the shapes extracted from the laser scan data received in 100. For example, each shape that was clustered together as part of a k-means clustering algorithm can be classified into the same category.

In further embodiments, the laser scan data received in 100 may only represent training data used to identify typical vehicle shapes. Accordingly, there may not be a need to classify the training data and the computing device may instead classify shapes of vehicles extracted from new laser scan data.

The computing device can compare each new shape of a vehicle to the vehicle profiles generated in 130. The shape can then be classified based on a vehicle profile that is a closest match. For example, attributes of the shapes can be compared to the vehicle profiles and/or the Euclidean distance can be used to measure the similarity of the shape to a profile.

While the steps depicted in FIG. 1 have been described as performed in a particular order, the order described is merely exemplary, and various different sequences of steps can be performed, consistent with certain disclosed embodiments. Further, the steps described are not intended to be exhaustive or absolute, and various steps can be inserted or removed.

Figure 2A:
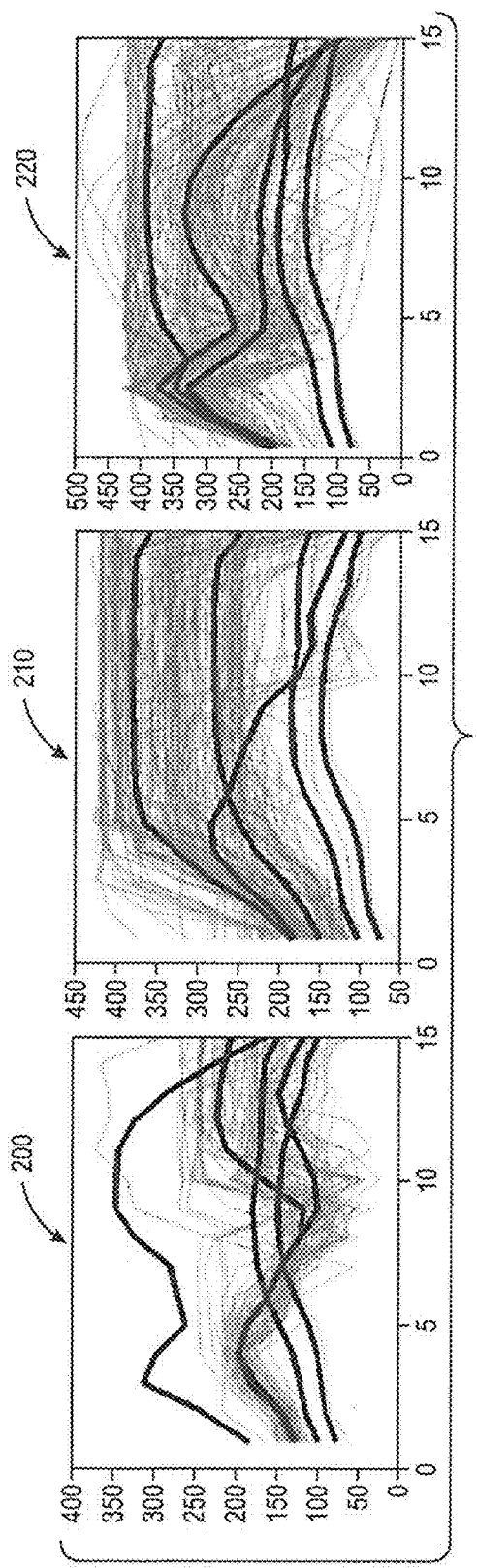
FIG. 2A is a diagram depicting clustered two-dimensional shapes of different vehicle classes obtained from laser scan data, consistent with certain disclosed embodiments.

FIG. 2A is a diagram depicting clustered two-dimensional shapes of different vehicle classes obtained from laser scan data, consistent with certain disclosed embodiments. In particular, FIG. 2A depicts three images, where each image represents a combination of shapes of the same vehicle class and each shape of a vehicle is represented by a single line. For example, each line can be generated from laser scan data obtained from a laser scanner positioned to emit and record beams of light targeted towards the side of passing vehicles. In embodiments, each line can represent a shape that was generated using the steps described in regard to FIG. 1.

Additionally, each image includes five thick lines that can represent results of k-means clustering the shapes of the same vehicle class where the number of clusters is five. Each thick line may represent a potential profile for the vehicle class.

As an example, image 200 can represent a combination of shapes that represent vehicles of a vehicle class titled "passenger vehicle with one trailer." Image 210 can represent a combination of shapes that represent vehicles of a vehicle class titled "truck." Image 220 can represent a combination of shapes that represent a vehicle class titled "truck with one trailer." The x axis can represent the x axis with respect to the capturing laser scanner, and the y axis can represent the distance measured by the laser scanner for each coordinate.

In some embodiments, the shapes depicted in FIG. 2 may be the result of training or testing a computing device using the steps described in regard to FIG. 1. Accordingly, each vehicle class type can be identified manually and can be associated with the resultant shape extracted from laser scan data of a particular vehicle.

The shapes described herein and depicted in the figures are merely for the purpose of illustration, and are not intended to be limiting. A shape of a vehicle, as discussed herein, may, in some embodiments, not refer to an actual image that is displayed, but instead may refer to a data structure containing the relevant data (e.g. coordinate and distance information). In other embodiments, a shape of a vehicle may be displayed as an image or the data structure may be processed to allow for displaying a representation of the shape.

Additionally, the vehicle profiles described herein and depicted in the figures are merely for the purpose of illustration, and are not intended to be limiting. A vehicle profile, as discussed here, may, in some embodiments, not refer to an image that is displayed, but instead may merely refer to a data structure containing the relevant data (e.g. an amalgamation of data from shapes that have been clustered together). In other embodiments, a depiction of a vehicle profile may be displayed or the data structure may be processed to allow for displaying a representation of the vehicle profile.

FIG. 2A can be interpreted to show that some matches can be identified based on the potential profiles presented by the thick lines. For example, lines that are similar to the potential profiles and/or are close in distance would be classified based on that profile. However, FIG. 2A can also be interpreted to show that some vehicles of a particular class may not be easily identified as the resultant shape may not be similar and/or not close in distance to any of the potential profiles for that particular class.

FIG. 2A may be interpreted to show that such vehicle classification can suffer from space shift and scaling problems. Distinction between some shapes might be difficult because vehicles across a vehicle class may be similar in regard to certain elements (e.g. geometry) while different in regard to other elements (e.g. vehicle size angle).

Figure 2B:
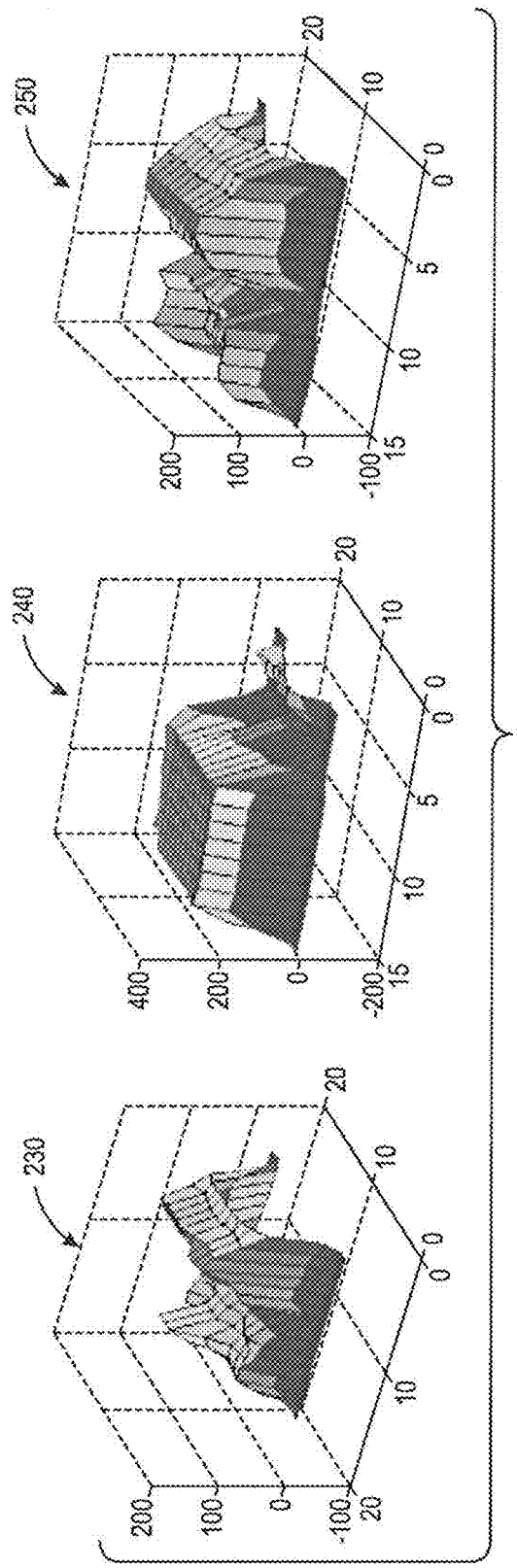
FIG. 2B is a diagram depicting three-dimensional shapes of different vehicle classes obtained from laser scan data, consistent with certain disclosed embodiments.

FIG. 2B is a diagram depicting three-dimensional shapes of different vehicle classes obtained from laser scan data, consistent with certain disclosed embodiments. In particular, FIG. 2B depicts three shapes, where each shape can represent a shape generated using the steps described in regard to FIG. 1. For example, each shape can be generated from laser scan data obtained from a laser scanner positioned to emit and record beams of light targeted from above and to the side of passing vehicles.

As an example, each of shape 230, shape 240, and shape 250 can represent a shape generated based on laser scan data of vehicles of a vehicle class titled "truck with trailer." The x axis and y axis can represent the x axis and y axis with respect to the capturing laser scanner, and the z axis can represent the distance measured by the laser scanner for each coordinate.

FIG. 2B can be interpreted to show that some three-dimensional shapes of vehicles of the same vehicle class may not be substantially similar. In some embodiments, a computing device may not be able to identify a common shape or pattern between shapes 230, 240, and 250 and/or may not cluster shapes 230, 240, and 250 together. Different sizes of the vehicles and their trailers can make class identification difficult.

Figure 3:
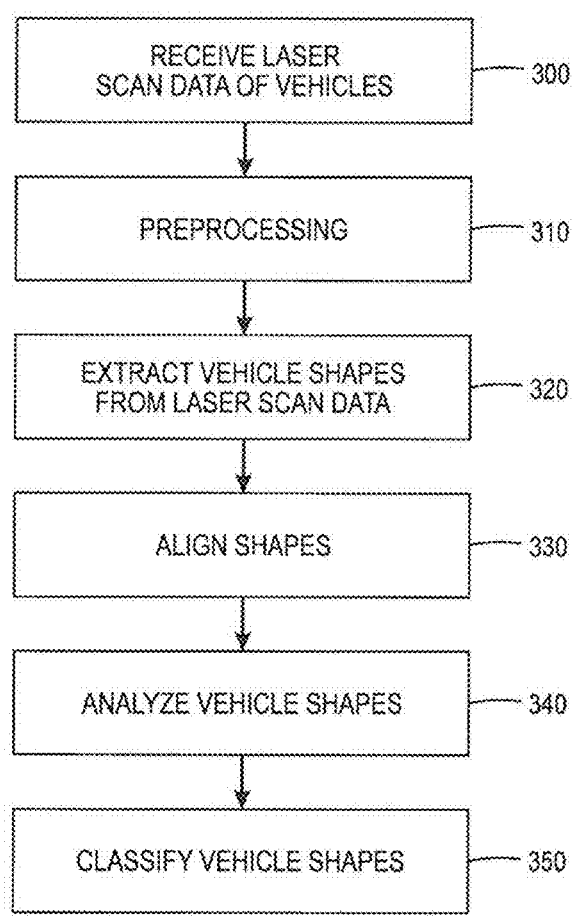
FIG. 3 is a flow diagram illustrating an exemplary method of classifying vehicles from laser scan data, consistent with certain disclosed embodiments.

FIG. 3 is a flow diagram illustrating an exemplary method of classifying vehicles from laser scan data, consistent with certain disclosed embodiments. The process can begin in 300 when a computing device receives laser scan data corresponding to multiple vehicles. In some embodiments, the computing device can receive the laser scan data from a laser scanner that is directly or indirectly attached to the computing device. In other embodiments, the computing device can be remote to the laser scanner and can receive the laser scan data via, for example, a network connection.

In some embodiments, the laser scan data can be data collected from laser scanners positioned to scan various angles of vehicle traffic. For example, the laser scanners can be positioned to scan the front of oncoming vehicles, sides of passing vehicles, as well as indirect angles, such as angles that capture a combination of the front, side, and top of passing vehicles. Additionally, the laser scan data can come from a single laser scanner or from multiple laser scanners positioned to cover different lanes of traffic or to cover different angles of traffic.

In some implementations, the computing device can receive the laser scan data continually as the laser scanner generates the data from vehicle traffic, while, in further implementations, the computing device can receive the laser scan data periodically for multiple vehicles and/or for a block of time. In still farther implementations, the computing device can initially receive a single set of laser scan data that includes data from vehicle traffic, and the single set of laser scan data can represent training data used to train the computing device for classifying vehicles in future laser scan data.

In 310, the computing device can, in some embodiments, perform one or more preprocessing steps on the laser scan data. The laser scan data received in 300 can potentially include data noise, data from overlapping vehicles, invalid data, etc. For example, weather condition such as snow, rain, and/or high vehicle speeds can introduce data noise, and surfaces that do not exhibit sufficient reflectivity can produce at least partially invalid laser scan data.

In some embodiments, the one or more preprocessing steps can include data interpolation of missing data that is removed as invalid or classified as noise. For example, the missing data can be replaced using interpolation based on the missing data's nearest neighbor in the laser scan data (e.g. a distance measurement adjacent to that of the missing data).

In additional embodiments, the one or more preprocessing steps can include segmenting vehicle bodies. For example, when a vehicle being scanned (I.e, the vehicle of interest) overlaps with vehicles in neighboring lanes, the resultant laser scan data can include artifacts on the edges of the data that correspond to the vehicles in the neighboring lanes. Accordingly, each point of data in the laser scan data can be identified as the vehicle of interest or background by setting thresholds and grouping points into connected components. Generally, the largest grouped rectangular region of points represents the vehicle of interest. According, the segments of data corresponding to the vehicles in neighboring lanes can be identified and the data corresponding to the vehicle of interest can be cropped.

In 320, the computing device can extract two-dimensional or three-dimensional shapes of vehicles based on the laser scan data, in some embodiments, the shapes can be extracted using the laser scan data after the laser scan data has been preprocessed in 310.

In 330, the computing device can address space shift and scaling problems with vehicle shapes by aligning the shapes using sequence kernels, such as, for example, global alignment kernels.

In some embodiments, the computing device can start with one-dimensional kernels and then generalize them to multi-dimensional kernels. For example, let S(X) be a set of sequences taking values in an arbitrary space X. Given two sequences $x=(x_1, \ldots, x_n)$ and $y=(y_1, \ldots, y_m)$ of lengths a and m, an alignment $\pi$ between x and y is a pair of increasing vectors $(\pi_1, \pi_2)$ of length $p \leq n+m-1$ such that $1=\pi_1(1) \leq \ldots \leq \pi_1(p)=n$ and $1=\pi_2(1) \leq \ldots \leq \pi_2(p)=m$, with unitary increments and no simultaneous repetitions. Namely, for indices $1 \leq i \leq p-1$, the increment vector of $\pi$ belongs to a set of three elementary moves represented as $M=\{(0,1),(1,0),(1,1)\}$ moves, $$(\Delta\pi_1(i+1), \Delta\pi_2(i+1)) \in M$$

where $\Delta\pi_j(i+1)=+\pi_j(i), j=1, 2$. The two coordinates $\pi_1$ and $\pi_2$ of the alignment it are known as warping functions. Alignment $\pi$ it is only constrained by lengths n and m of x and y, respectively.

Let A(n,m) denote the set of all alignments between two sequences of length n and m. The dynamic time warping (DTW) distance between x and y is defined as $$\mathrm{DTW}(x,y) = \min_{\pi \in A(n,m)} D_{x,y}(\pi)$$

where the cost D is defined by a local divergence $\delta$ between any two points $x_i \in x$ and $y_j \in y$, $1 \leq i \leq n$, $1 \leq j \leq m$:

$$D_{x,y}(\pi) := \sum_{i=1}^{|\pi|} \delta(x_{\pi_1(i)}, y_{\pi_2(i)})$$

The DTW can be generalized to the global alignment kernel (GAK), defined over all alignment distances in A(n, m) as follows:

$$k_{GA}(x, y) := \sum_{\pi \in A(n,m)} e^{-D_{x,y}(\pi)}$$

The above equation can be rewritten using the local similarity function $\phi$ induced from the local divergence $\delta$ as $\phi := e^{-\delta}$:

$$k_{GA}(x, y) = \sum_{\pi \in A(n,m)} \prod_{i=1}^{|\pi|} \Phi(x_{\pi_1(i)}, y_{\pi_2(i)})$$

Unlike the DTW, the similarity described by $k_{G\ A}$ incorporates the whole spectrum of costs $\{D_{x,y(\pi)}, \pi \in A(n,m)\}$ and provides a richer statistic than the minimum of that t, considered by the DTW distance.

The computational cost to compute $k_{G\ A}$ is O(mn), similar to the DTW distance. More precisely, the value of $k_{G\ A}(x,y)$ is equal to M(n,m) where the coefficients M(i,j) are defined by the boundary values M(0,0)=1, M(0, i)=M(j, 0)=0 and the recurrence $M(i,j)=\phi(x_i, y_j)(M(i-1,j-1)+M(i,j-1)+M(i-1,j))$.

Accordingly, computing exact DTW distances can be computationally expensive. Therefore, in some embodiments, to speed up the DTW algorithm, the full set of alignments can be constrained. Such constraints can be formulated with weights $\gamma_{i,j}$ that modify the cost function of the DTW equation into $$D^\gamma_{x,y}(\pi) := \sum_{i=1}^{|\pi|} \gamma_{\pi_1(i), \pi_2(i)} \delta(x_{\pi_1(i)}, y_{\pi_2(i)})$$

In some embodiments, only alignments it close to the diagonal may be considered by defining the Sakoe-Chiba band $\gamma_{i,j=1}$, if $|i-j|<T$, $\infty$, otherwise; which ensures that $\pi_1(i)$ and $\pi_2(i)$ remain close as increases. Such an increase in speed may come at the cost of an approximation, since the resulting optimal path may be sub-optimal. Nevertheless, evaluations on different datasets show that setting the band width T to $\alpha \times \max(n,m)$, where $\alpha \in [0.1-0.2]$ can effectively trade some performance for speed.

Weights introduced for DTW can be extended to global alignment kernels. Indeed any positively defined kernel co on N, can be paired with a kernel φ on X to form a constrained global alignment kernel:

$$k_{GA}(x, y) = \sum_{\pi \in A(n,m)} \prod_{i=1}^{|\pi|} T_{\omega,\phi}(x_{\pi_1(i)}, y_{\pi_2(i)})$$

where $$T_{\omega,\phi} = \frac{\omega \cdot \phi}{2 - \omega \cdot \phi}.$$

The kernel ω modulates the similarity of two points $x_i$ and $y_j$, by taking into account their respective location i and j while φ quantifies the similarity of $x_i$ and $y_j$. We consider radial basis kernels ω(i,j)=ψ(|i−j|) where ψ is a real-valued function of N. In the evaluation, a triangular kernel can be used for integers proposed m the above equation, $$\omega(i, j) = \left(1 - \frac{|i-j|}{T}\right)_+,$$

where T∈N is the order of the kernel.

The DTW distances and global alignment kernels allow a computing device to efficiently process shapes extracted from laser scanning data when an appropriate selection of function δ for the space X is made. For example, shapes representing side and front vehicle views can be one-dimensional sequences obtained from the full vehicle shape by aggregation along the length and width dimensions, where the aggregation is a max or mean function. In such a case, X=R and δ(x,y)=|x−y|.

For a full vehicle scan, x and y can both be d-dimensional sequences, where x,y∈X=$R^d$, d>1. Then function δ can be defined as either $1_1$- or $1_2$-norm, δ(x,y)=$\|x-y\|_{1,2}$.

In 340, the computing device can analyze the aligned shapes of vehicles. In embodiments, the computing device can perform clustering methods on the shapes of vehicles to identify common or typical patterns of shapes (i.e. "vehicle profiles'). For example, the computing device can perform a k-means clustering algorithm on the aligned shapes and generate multiple vehicle profiles based on the clustering.

In 350, the computing device can classify shapes of vehicles. In some embodiments, the computing device can classify the shapes generated from the laser scan data received in 300. For example, each aligned shape that was clustered together as part of a k-means clustering algorithm can be classified into the same category.

In further embodiments, the laser scan data received in 300 may only represent training data used to identify typical vehicle shapes. Accordingly, there may not be a need to classify the training data and the computing device may instead classify shapes of vehicles generated from new laser scan data.

The computing device can compare each new shape of a vehicle to the vehicle profiles generated in 340. The shape can then be classified based on a vehicle profile that is a closest match. For example, attributes of the shapes can be compared to the vehicle profiles and/or the Euclidean distance can be used to measure the similarity of the shape to a profile.

While the steps depicted in FIG. 3 have been described as performed in a particular order, the order described is merely exemplary, and various different sequences of steps can be performed, consistent with certain disclosed embodiments. Further, the steps described are not intended to be exhaustive or absolute, and various steps can be inserted or removed.

Figure 4A:
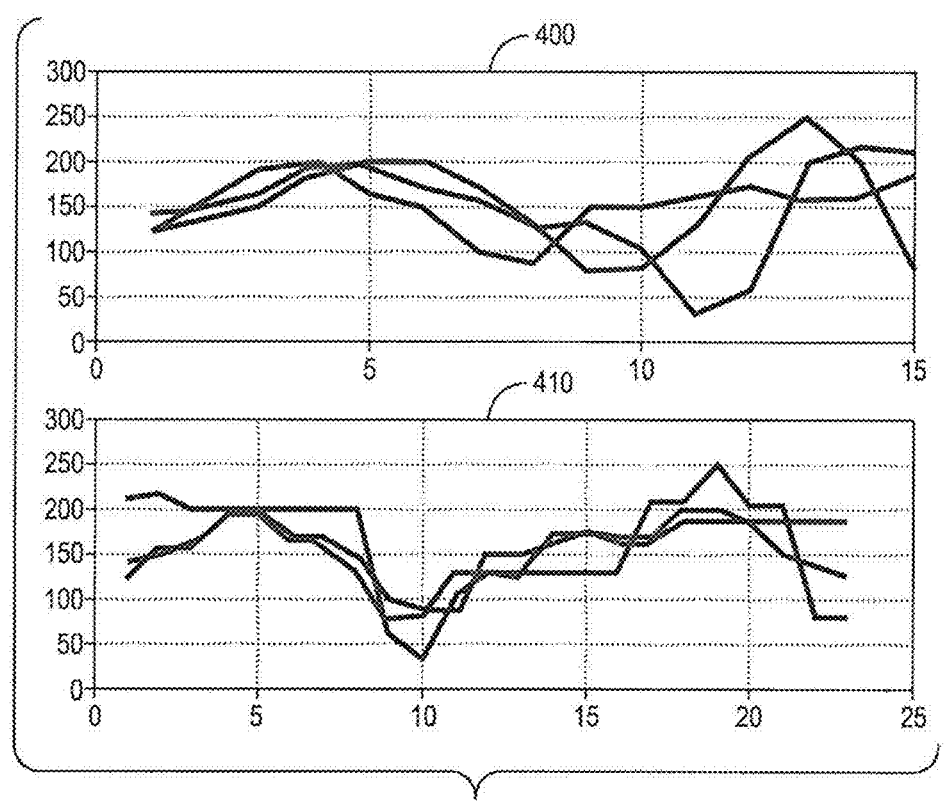
FIG. 4A is a diagram depicting three two-dimensional shapes before and after alignment, of different vehicles obtained from laser scan data, consistent with certain disclosed embodiments.

FIG. 4A is a diagram depicting three two-dimensional shapes, before and after alignment, of different vehicles obtained from laser scan data, consistent with certain disclosed embodiments. In particular, FIG. 2A depicts image 400, which can represent three side view shapes of three different vehicles, and image 410, which can represent three side view shapes of the same three vehicles. For example, each line can be generated from laser scan data obtained from a laser scanner positioned to emit and record beams of light targeted towards the sides of passing vehicles. The x axis can represent the x axis with respect to the capturing laser scanner, and the y axis can represent the distance measured by the laser scanner for each coordinate.

In some implementations, each line in image 400 can represent a shape that was generated using the steps described in regard to FIG. 1, and each line in image 410 can represent a shape that was generated using the steps described in regard to FIG. 3.

In some embodiments, the shapes depicted in FIG. 4A may be the result of training or testing a computing device using the steps described in regard to FIG. 1 and/or FIG. 3. Accordingly, for the purpose of the test each of the three vehicles can be of the same vehicle class type.

FIG. 4A can be interpreted to show that the shapes depicted in image 400 are less similar than the shapes depicted in image 410. Accordingly, shapes generated using the process described in regard to FIG. 3 (i.e. using global alignment kernels) can facilitate recognition tasks by alleviating space shift and scaling problems that can hamper recognition using the process described in regard to FIG. 1.

Figure 4B:
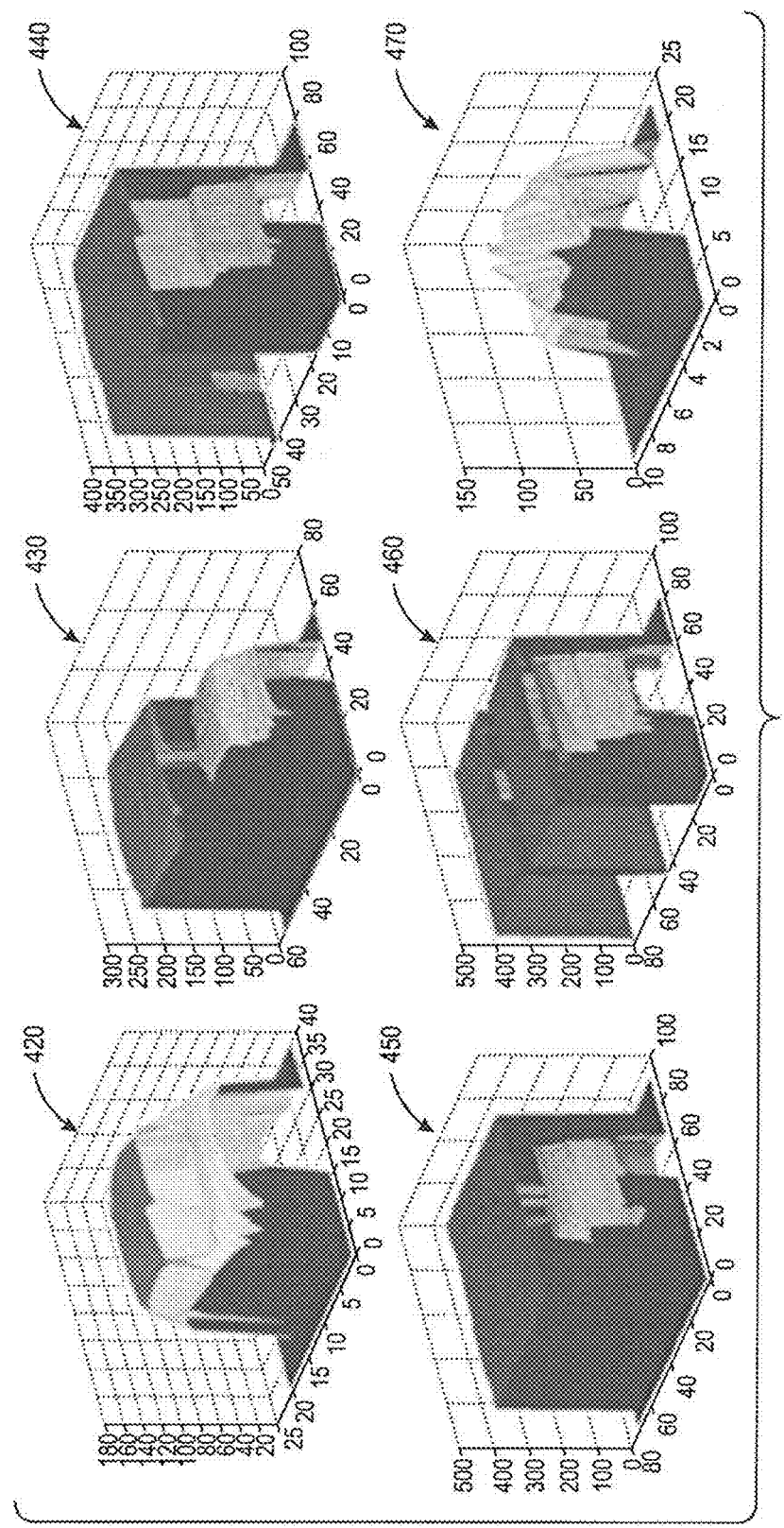
FIG. 4B is a diagram depicting six three-dimensional vehicle profiles of different vehicle classes obtained from laser scan data, consistent with certain disclosed embodiments.

FIG. 4B is a diagram depicting six three-dimensional vehicle profiles of different vehicle classes obtained from laser scan data, consistent with certain disclosed embodiments. In particular, FIG. 4B depicts six three-dimensional renderings of vehicle profiles, where each rendering can represent a profile generated using the steps described in regard to FIG. 3. For example, each rendering can be generated from laser scan data obtained from a laser scanner positioned to emit and record beams of light targeted from above and to the side of passing vehicles, wherein shapes were generated from the laser scan data and aligned using global alignment kernels.

As an example, rendering 420 can represent a profile for passenger vehicles, rendering 430 can represent a profile for passenger vehicles with one trailer, rendering 440 can represent a profile for trucks, rendering 450 can represent a profile for trucks with one trailer, rendering 460 can represent a profile for trucks with two trailers, and rendering 470 can represent a profile for motorcycles. The x axis and y axis can represent the x axis and y axis with respect to the capturing laser scanner, and the z axis can represent the distance measured by the laser scanner for each coordinate.

Figure 5:
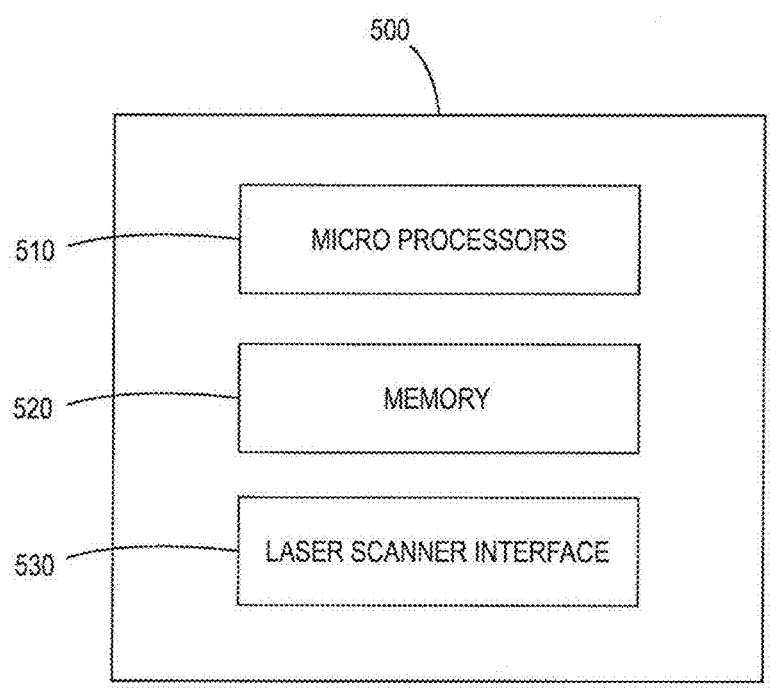
FIG. 5 is a diagram illustrating an exemplary hardware system for classifying vehicles from laser scan data, consistent with certain disclosed embodiments.

FIG. 5 is a diagram illustrating an exemplary hardware system for classifying vehicles from laser scan data, consistent with certain disclosed embodiments. Computing device 500 may represent any type of one or more computing devices.

Computing device 500 may include, for example, one or more microprocessors 510 of varying core configurations and clock frequencies; one or more memory devices or computer-readable media 520 of varying physical dimensions and storage capacities, such as flash drives, hard drives, random access memory, etc., for storing data, such as shapes, images, files, and program instructions for execution by one or more microprocessors 510; etc. One or more microprocessors 510, and one or more memory devices or computer-readable media 520 may be part of a single device as disclosed in FIG. 5 or may be contained within multiple devices. Those skilled in the art will appreciate that the above-described componentry is exemplary only, as computing device 500 may comprise any type of hardware componentry, including any necessary accompanying firmware or software, for performing the disclosed embodiments.

In some embodiments, computing device 500 may also include laser scanner interface 530 for communicating, directly or indirectly, with one or more laser scanners. For example, computing device 500 can receive laser scan data from the one or more laser scanners via laser scanner interface 530, or, in further embodiments, can send commands to the one or more laser scanners.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", s", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for classifying vehicles comprising:
   receiving laser scan data corresponding to a plurality of vehicles;
   extracting, based on the laser scan data, a plurality of vehicle shapes corresponding to the plurality of vehicles;
   aligning the plurality of vehicle shapes to generate a plurality of aligned vehicle shapes, wherein aligning the plurality of vehicle shapes comprises aligning the plurality of vehicle shapes using sequence kernels; and
   generating one or more vehicle profiles based on the aligned vehicle shapes.

2. The method of claim 1, wherein the sequence kernels are global alignment kernels.

3. The method of claim 2, wherein sets of alignments corresponding to the global alignment kernels are constrained based on determined weights.

4. The method of claim 1, further comprising classifying the plurality of vehicles by comparing the plurality of aligned vehicle shapes to the one or more vehicle profiles.

5. The method of claim 1, further comprising:
   receiving additional laser scan data corresponding to at least one additional vehicle;
   extracting, based on the additional laser scan data, at least one additional vehicle shape corresponding to the at least one additional vehicle; and
   classifying the at least one additional vehicle by comparing the at least one additional vehicle shape to the one or more vehicle profiles.

6. The method of claim 1, wherein the plurality of vehicle shapes are two-dimensional shapes.

7. The method of claim 1, wherein the plurality of vehicle shapes are three-dimensional shapes.

8. The method of claim 1, further comprising, prior to extracting the plurality of vehicle shapes, replacing missing data in the laser scan data using interpolation based on the missing data's neighbor in the laser scan data.

9. The method of claim 1, further comprising identifying and extracting data corresponding to vehicles of interest in the laser scan data, wherein extracting, based on the laser scan data, the plurality of vehicle shapes comprises extracting the plurality of vehicle shapes from the extracted data.

10. A system for classifying vehicles comprising:
    a processing system comprising one or more processors; and
    a memory system comprising one or more computer-readable media, wherein the one or more computer-readable media contain instructions that, when executed by the processing system, cause the processing system to perform operations comprising:
    receiving laser scan data corresponding to a plurality of vehicles;
    extracting, based on the laser scan data, a plurality of vehicle shapes corresponding to the plurality of vehicles;
    aligning the plurality of vehicle shapes to generate a plurality of aligned vehicle shapes, wherein aligning the plurality of vehicle shapes comprises aligning the plurality of vehicle shapes using sequence kernels; and
    generating one or more vehicle profiles based on the aligned vehicle shapes.

11. The system of claim 10, wherein the sequence kernels are global alignment kernels.

12. The system of claim 11, wherein sets of alignments corresponding to the global alignment kernels are constrained based on determined weights.

13. The system of claim 10, the operations further comprising classifying the plurality of vehicles by comparing the plurality of aligned vehicle shapes to the one or more vehicle profiles.

14. The system of claim 10, the operations further comprising:
    receiving additional laser scan data corresponding to at least one additional vehicle;
    extracting, based on the additional laser scan data, at least one additional vehicle shape corresponding to the at least one additional vehicle; and
    classifying the at least one additional vehicle by comparing the at least one additional vehicle shape to the one or more vehicle profiles.

15. The system of claim 10, wherein the plurality of vehicle shapes are two-dimensional shapes.

16. The system of claim 10, wherein the plurality of vehicle shapes are three-dimensional shapes.

17. The system of claim 10, the operations further comprising, prior to extracting the plurality of vehicle shapes, replacing missing data in the laser scan data using interpolation based on the missing data's neighbor in the laser scan data.

18. The system of claim 10, the operations further comprising identifying and extracting data corresponding to vehicles of interest in the laser scan data, wherein extracting, based on the laser scan data, the plurality of vehicle shapes comprises extracting the plurality of vehicle shapes from the extracted data.

\* \* \* \* \*